United States Patent
Audet et al.

(10) Patent No.: US 7,594,259 B1
(45) Date of Patent: Sep. 22, 2009

(54) METHOD AND SYSTEM FOR ENABLING FIREWALL TRAVERSAL

(75) Inventors: Francois Audet, Santa Clara, CA (US); Cedric Aoun, Boulogne Billancourt (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 765 days.

(21) Appl. No.: 10/941,719

(22) Filed: Sep. 15, 2004

(51) Int. Cl.
*G06F 9/00* (2006.01)
*G06F 15/16* (2006.01)
*G06F 17/00* (2006.01)

(52) U.S. Cl. ........................................ 726/11; 713/153
(58) Field of Classification Search .................. 726/11, 726/12; 713/153
See application file for complete search history.

(56) References Cited

U.S. PATENT DOCUMENTS

| | | | | |
|---|---|---|---|---|
| 5,983,350 A * | 11/1999 | Minear et al. | .................. | 726/11 |
| 6,233,688 B1 * | 5/2001 | Montenegro | .................. | 726/11 |
| 6,463,474 B1 * | 10/2002 | Fuh et al. | .................... | 709/225 |
| 6,584,186 B1 * | 6/2003 | Aravamudan et al. | .. | 379/201.03 |
| 6,609,154 B1 * | 8/2003 | Fuh et al. | .................... | 709/225 |
| 6,697,377 B1 * | 2/2004 | Ju et al. | ...................... | 370/466 |
| 6,747,970 B1 * | 6/2004 | Lamb et al. | ................. | 370/352 |
| 6,760,420 B2 * | 7/2004 | Heilmann et al. | ........... | 379/189 |
| 7,020,130 B2 * | 3/2006 | Krause et al. | ............... | 370/352 |
| 7,050,422 B2 * | 5/2006 | Xu et al. | ...................... | 370/352 |
| 7,068,655 B2 * | 6/2006 | March et al. | ................ | 370/392 |
| 7,069,432 B1 * | 6/2006 | Tighe et al. | ................. | 713/151 |
| 7,072,341 B2 * | 7/2006 | Xu et al. | ...................... | 370/392 |
| 7,076,393 B2 * | 7/2006 | Ormazabal et al. | .......... | 702/122 |
| 7,095,716 B1 * | 8/2006 | Ke et al. | ...................... | 370/230 |
| 7,133,511 B2 * | 11/2006 | Buntin et al. | ............... | 379/189 |
| 7,173,928 B2 * | 2/2007 | Xu et al. | ...................... | 370/352 |
| 7,194,004 B1 * | 3/2007 | Thomsen | ..................... | 370/401 |
| 7,225,271 B1 * | 5/2007 | DiBiasio et al. | ............. | 709/240 |
| 7,248,577 B2 * | 7/2007 | Hakusui | ...................... | 370/352 |
| 7,254,832 B1 * | 8/2007 | Christie, IV | ................. | 726/11 |
| 7,260,085 B2 * | 8/2007 | Dobbins et al. | ............. | 370/352 |
| 7,284,268 B2 * | 10/2007 | Schmidt et al. | ............... | 726/11 |
| 7,295,556 B2 * | 11/2007 | Roese et al. | ............. | 370/395.3 |
| 7,305,705 B2 * | 12/2007 | Shelest et al. | ................. | 726/15 |
| 7,307,963 B2 * | 12/2007 | Chow et al. | ................. | 370/259 |
| 7,310,356 B2 * | 12/2007 | Abdo et al. | ................. | 370/522 |
| 7,340,771 B2 * | 3/2008 | Chan et al. | .................... | 726/12 |
| 7,372,840 B2 * | 5/2008 | Le et al. | ...................... | 370/338 |
| 7,408,926 B1 * | 8/2008 | Moeck et al. | ............... | 370/352 |
| 7,421,734 B2 * | 9/2008 | Ormazabal et al. | ............ | 726/11 |

(Continued)

Primary Examiner—David Garcia Cervetti
(74) Attorney, Agent, or Firm—Anderson Gorecki & Manaras LLP

(57) ABSTRACT

A method and system for enabling firewall traversal of media communications from a client device. The firewall infers authentication or validation of the client device based upon communications between the client device and a device controller known to the firewall. The firewall monitors packets sent from the device controller to the client device. If the device controller sends packets to the client device for a sufficiently long period of time and with sufficient frequency, or if the packets are of a certain type, then the firewall deems the client device to be validated and permits the client device to send data packets through the firewall. The device controller may include a media gateway controller, a port discovery server, or similar such device controllers. The device controller and client device communicate based upon a protocol, which need not be understood by the firewall.

20 Claims, 4 Drawing Sheets

U.S. PATENT DOCUMENTS

| | | | |
|---|---|---|---|
| 7,523,491 B2* | 4/2009 | Dosa Racz et al. | 726/11 |
| 2002/0021791 A1* | 2/2002 | Heilmann et al. | 379/189 |
| 2002/0103898 A1* | 8/2002 | Moyer et al. | 709/224 |
| 2002/0114333 A1* | 8/2002 | Xu et al. | 370/392 |
| 2002/0122416 A1* | 9/2002 | Xu et al. | 370/352 |
| 2002/0138596 A1* | 9/2002 | Darwin et al. | 709/220 |
| 2003/0002637 A1* | 1/2003 | Miyauchi et al. | 379/93.01 |
| 2003/0058827 A1* | 3/2003 | Chow et al. | 370/338 |
| 2003/0084162 A1* | 5/2003 | Johnson et al. | 709/227 |
| 2004/0024879 A1* | 2/2004 | Dingman et al. | 709/227 |
| 2004/0052257 A1* | 3/2004 | Abdo et al. | 370/392 |
| 2004/0109518 A1* | 6/2004 | Miller et al. | 375/356 |
| 2004/0128545 A1* | 7/2004 | Chakravarty | 713/201 |
| 2004/0128554 A1* | 7/2004 | Maher et al. | 713/201 |
| 2004/0139350 A1* | 7/2004 | Lyon et al. | 713/201 |
| 2004/0161086 A1* | 8/2004 | Buntin et al. | 379/189 |
| 2004/0174864 A1* | 9/2004 | Klaghofer | 370/352 |
| 2004/0213150 A1* | 10/2004 | Krause et al. | 370/229 |
| 2004/0234049 A1* | 11/2004 | Melideo | 379/88.17 |
| 2004/0234056 A1* | 11/2004 | Heilmann et al. | 379/196 |
| 2004/0250124 A1* | 12/2004 | Chesla et al. | 713/201 |
| 2004/0255156 A1* | 12/2004 | Chan et al. | 713/201 |
| 2005/0063357 A1* | 3/2005 | Wewalaarachchi et al. | 370/352 |
| 2005/0075842 A1* | 4/2005 | Ormazabal et al. | 702/188 |
| 2005/0076235 A1* | 4/2005 | Ormazabal et al. | 713/201 |
| 2005/0076238 A1* | 4/2005 | Ormazabal et al. | 713/201 |
| 2005/0091407 A1* | 4/2005 | Vaziri et al. | 709/246 |
| 2005/0111382 A1* | 5/2005 | Le et al. | 370/254 |
| 2005/0124288 A1* | 6/2005 | Karmi et al. | 455/3.01 |
| 2005/0201304 A1* | 9/2005 | Olshansky | 370/282 |
| 2005/0201357 A1* | 9/2005 | Poyhonen | 370/352 |
| 2005/0201370 A1* | 9/2005 | Poyhonen et al. | 370/389 |
| 2005/0210292 A1* | 9/2005 | Adams et al. | 713/201 |
| 2005/0259637 A1* | 11/2005 | Chu et al. | 370/352 |
| 2005/0283536 A1* | 12/2005 | Swanson et al. | 709/232 |
| 2006/0005254 A1* | 1/2006 | Ross | 726/27 |
| 2006/0047838 A1* | 3/2006 | Chauhan | 709/230 |
| 2006/0059551 A1* | 3/2006 | Borella | 726/13 |
| 2006/0075483 A1* | 4/2006 | Oberle et al. | 726/14 |
| 2006/0078096 A1* | 4/2006 | Poyhonen et al. | 379/88.12 |
| 2006/0085548 A1* | 4/2006 | Maher et al. | 709/227 |
| 2006/0092861 A1* | 5/2006 | Corday et al. | 370/256 |
| 2006/0209794 A1* | 9/2006 | Bae et al. | 370/352 |
| 2007/0005804 A1* | 1/2007 | Rideout | 709/246 |
| 2007/0036143 A1* | 2/2007 | Alt et al. | 370/352 |
| 2007/0094412 A1* | 4/2007 | Sollee | 709/245 |
| 2007/0124813 A1* | 5/2007 | Ormazabal et al. | 726/11 |
| 2007/0140267 A1* | 6/2007 | Yang | 370/401 |
| 2007/0147380 A1* | 6/2007 | Ormazabal et al. | 370/392 |
| 2007/0186093 A1* | 8/2007 | Tighe et al. | 713/151 |
| 2007/0209067 A1* | 9/2007 | Fogel | 726/11 |
| 2007/0274504 A1* | 11/2007 | Maes | 379/265.01 |
| 2007/0291650 A1* | 12/2007 | Ormazabal | 370/244 |
| 2008/0013524 A1* | 1/2008 | Hwang et al. | 370/352 |
| 2008/0098472 A1* | 4/2008 | Enomoto et al. | 726/12 |
| 2008/0229088 A1* | 9/2008 | Barth et al. | 713/1 |
| 2009/0006841 A1* | 1/2009 | Ormazabal et al. | 713/152 |

* cited by examiner

METHOD AND SYSTEM FOR ENABLING FIREWALL TRAVERSAL

FIELD OF THE APPLICATION

This invention relates to firewall traversal and, in particular, to enabling firewall traversal for IP media communications.

BACKGROUND OF THE INVENTION

Carriers, equipment manufacturers, and enterprises are embracing IP telephony and other IP-based media communications with increasing regularity. These IP-based communication networks present a difficulty in that their openness makes them vulnerable to security issues. As a result, most IP networks contain firewalls at various points.

Firewalls present a particular difficulty for peer-to-peer or multimedia communications, which are typically transmitted using UDP (User Datagram Protocol) packets. This poses difficulties for applications such as IP telephony, sometimes called voice-over-IP (VoIP), and for other peer-to-peer or multimedia applications, such as IP fax, video phones, interactive gaming, and other UDP-based media. Typically firewalls only permit incoming communications that meet certain firewall rules. Accordingly, UDP packets may be blocked by a firewall.

As more carriers begin to offer interactive gaming, VoIP and other IP telephony services, and as more enterprises offer VoIP to remote employees connecting to an enterprise network through a VPN (Virtual Private Network) connection, there needs to be a solution to the problem of traversing a firewall without eliminating the firewall altogether.

One solution that has been attempted in the past is the establishment of application level gateways (ALGs) within the firewall itself. The limitations of this solution include the fact that ALGs are protocol-specific, which presents a problem since the ALG must inspect, parse and understand the various protocols that may be used. Any changes to the protocol may render the ALG ineffective. The ALG solution also imposes a significant cost on firewall resources in terms of memory and processing. It would be preferable to have a protocol independent solution for firewall traversal

SUMMARY OF THE APPLICATION

The present application describes a method and system for enabling firewall traversal. The firewall relies upon an apparent or inferred trust between a device controller known to the firewall and a client device communicating through the firewall to determine whether the client device is authorized, i.e. validated. If it appears that the known device controller trusts the client device based upon the frequency and duration of its communications with the client device, then the firewall permits the client device to transmit data traffic. Alternatively, if the known device controller exhibits trust in the client device through the establishment of a session or a security association, i.e. by engaging in communications that imply a certain level of trust, then the firewall permits the client device to transmit data traffic.

In one aspect, the present application provides a method for enabling packet communications through a firewall between a client device and a remote location, the firewall being located between the client device and a known device controller. The method includes steps of monitoring communications from the device controller to the client device to determine whether the client device is authorized, and allowing the transmission of data packets from the client device to the remote location if the client device is authorized.

In another aspect, the present application provides a system for enabling packet communications through a firewall, the firewall being located between a client device and a device controller. The system includes a monitoring component for monitoring packets received from the device controller and addressed to the client device and for determining if the client device is authorized based upon the received packets, and a firewall update component responsive to the monitoring component for setting a firewall rule, the firewall rule permitting passage of data packets from the client device.

Other aspects and features of the present application will become apparent to those ordinarily skilled in the art upon review of the following description of specific embodiments in conjunction with the accompanying figures.

BRIEF DESCRIPTION OF THE DRAWINGS

Reference will now be made, by way of example, to the accompanying drawings which show an embodiment of the present application, and in which.

Similar reference numerals are used in the figures to denote similar components.

DESCRIPTION OF SPECIFIC EMBODIMENTS

It will be understood by those of ordinary skill in the art that although the following description provides example embodiments that may have a particular context, such as a VoIP implementation, the present application is not limited to VoIP applications and is not protocol-specific.

Figure 1:
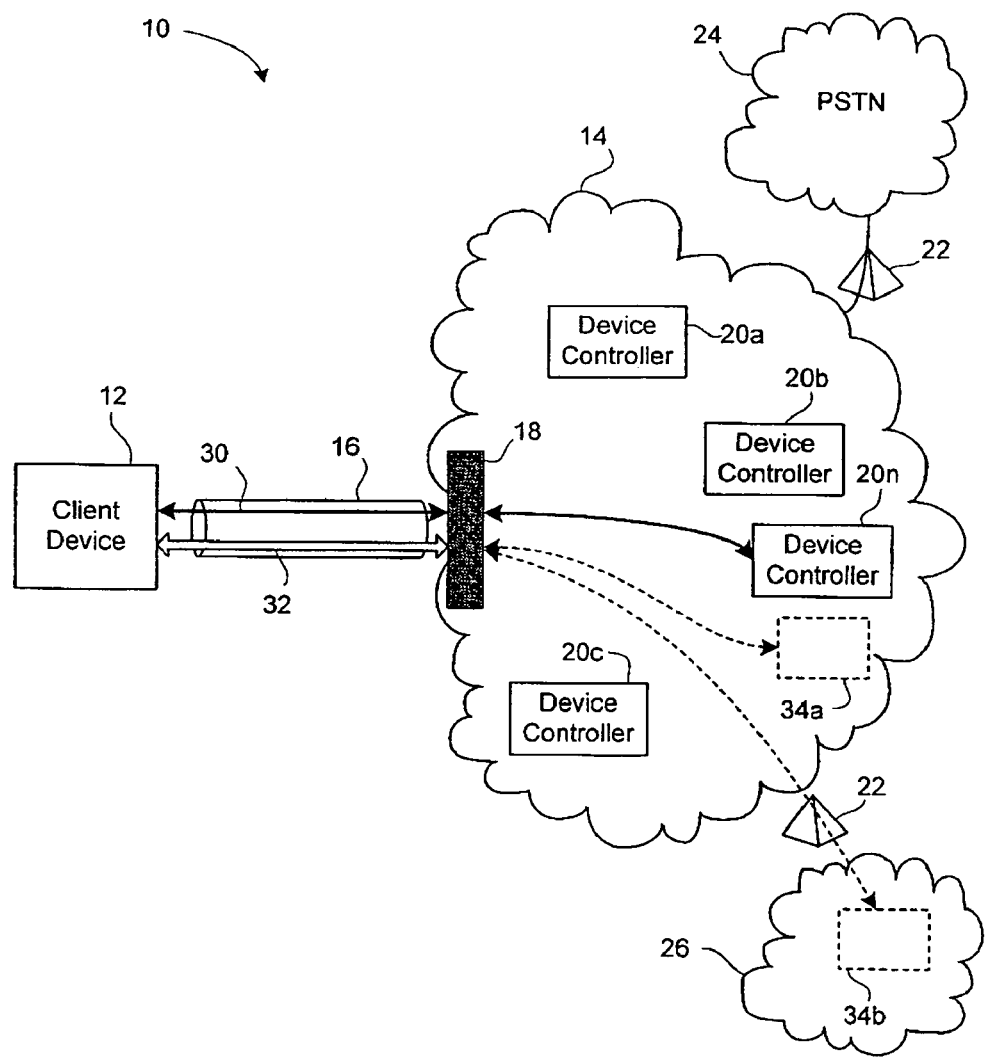
FIG. 1 diagrammatically shows an embodiment of a communication network.

Reference is first made to FIG. 1, which diagrammatically shows a communication network 10. The communication network includes an IP network 14. In some embodiments, the IP network 14 comprises a private network; in other embodiments, the IP network 14 is a public network. The IP network 14 may be an enterprise-specific local area network (LAN) or wide area network (WAN). In other embodiments, the IP network 14 may be a carrier network.

The IP network 14 may include one or more gateways 22 connecting the IP network 14 to other networks, such as a remote IP network 26 or the public switched telephone network (PSTN) 24. In one embodiment, the IP network 14 comprises an enterprise-specific network and the remote IP network 26 comprises a related enterprise-specific network, such as for a branch office. In one embodiment, one of the IP networks 14 or 26 comprises the Internet.

The communication network 10 includes a number of IP-based client devices 12 (only one is shown). The IP network 4 includes a number of device controllers 20 (shown as 20a, 20b, 20c, . . . , 20n). The communication network 10 also includes a firewall 18 between the client device 12 and the device controller 20. The firewall 18 has a protected side and an unprotected side. The client device 12 is on the unprotected side and the device controller 20 is on the protected side. The firewall 18 is for protecting the device controller 20 and other elements or devices within the IP network 14 from malicious or harmful communications originating from the unprotected side.

In one embodiment, the client device 12 comprises a VoIP phone and the device controller 20 comprises a gateway or, specifically, a media gateway controller or similar controller. In another embodiment, described below in connection with FIG. 3, the device controller 20 comprises a port discovery server, such as a STUN (Simple Traversal of UDP through NATs) server, as described in IETF RFC 3489. It will be understood by those of ordinary skill in the art that the following description is not necessarily limited to VoIP, but may be applied other IP-based media communications, including interactive gaming, video conferencing, and other applications. In other embodiments, the client device 20 may comprise a video phone, a gaming console, an IP fax, or other devices.

In one embodiment, the device controller 20 performs signaling and control communications with the client device 12 to set-up and tear-down media connections between the client device 12 and remote devices 34 (shown as 34*a* and 34*b*) elsewhere in the communication network 10. The client device 12 and its device controller 20 communicate based upon a predefined device control protocol. The protocol may be a standard open protocol or a proprietary protocol. For example, in some embodiments the protocol may include proprietary device control, MGCP (media gateway control protocol), H.248, or SIP (Session Initiation Protocol). In a case where the device controller comprises a port discovery server, the protocol may comprise a port discovery or echo protocol, such as the STUN protocol.

Each device controller 20 has a static IP address and a specified UDP port for signaling/control packet reception in accordance with the predefined protocol. The firewall 18 maintains a catalog or list of known device controllers 20 and their associated IP addresses and control ports. Accordingly, packets originating from or destined to the device controller 20 may be recognized by the firewall 18 based upon the source or destination IP address:port.

The client device 12 has a dynamic IP address. The client device 12 includes an IP protocol component and a media component. The two components share a single IP address. The client device 12 may be unknown to the firewall 18.

The client device 12 has a connection 16 to the IP network 14, although communications from the client device 12 to the IP network 14 must traverse the firewall 18. In other words, the client device 12 is on the unprotected side of the firewall 18 and the IP network 14 is on the protected side of the firewall 18. The connection 16 may comprise a VPN connection. The connection 16 enables the transmission of signaling/control packets over a signaling path 30 and data packets over a media path 32.

Because the client device 12 is unknown to the firewall 18, the firewall 18 may not permit the client device 12 to send UDP data packets to a destination address. The firewall 18 is configured to permit the passage of signaling/control packets to the device controller 20 on the basis that it knows the device controller 20, or more specifically, that it knows the address and specified UDP port for signaling/control packet reception at each of the device controllers 20. Based upon the destination address in the packets, it provides a pinhole in the firewall 18 for the known device controller 20 address:port combination.

The firewall 18 may decide to enable the traversal of UDP data packets from the client device 12, like a VoIP phone, to a destination address. The firewall 18 bases its decision on whether or not to allow data packets from the client device 12 upon whether or not the known device controller 20 appears to trust the client device 12. If the device controller 20 and the client device 12 are engaged in an active dialogue or if the device controller 20, at least, is exhibiting trust for or a relationship with the client device 12, then the firewall 18 relies upon the apparent relationship with device controller 20 and considers the client device 12 to be a "valid" or "authorized" device. A client device 12 that appears to be known to or trusted by one of the device controllers 20 is considered to have a "validated" or "authorized" status by the firewall 18.

In one embodiment, to establish whether the client device 12 is known to or trusted by the device controller 20, the firewall 18 monitors packets sent by the device controller's 20 UDP address:port for signaling and records the destination IP address and its binding to the device controller 20. In other words, the firewall 18 watches outgoing control traffic from the known device controllers 20 and associates the destination address:port of the client device 12 with the address:port of the known device controller 20.

Based upon the binding between the device controller 20 address and the destination address, the firewall 18 is aware that the device controller 20 has, at least, acknowledged the client device 12. To determine whether or not the device controller 20 exhibits an ongoing relationship with the client device 12, the firewall 18 may monitor communications associated with the binding between the device controller 20 and the client device 12 to ensure they meet predetermined minimum thresholds. These thresholds may relate to the frequency or duration of communications. In other embodiments, described below, the thresholds may relate to the type or nature of communications.

In one embodiment, the firewall 18 considers the client device 12 to be validated if the device controller 20 sends packets to the client device 12 with sufficient frequency to be considered 'continuous'. The firewall 18 may also require that the minimum frequency of packet transmission be maintained for a minimum period of time. In one embodiment, the firewall 18 considers the client device 12 to be validated if the device controller 20 sends packets to it for at least X minutes with an interval of no more than Y seconds between packets. In one embodiment, X has a value of about a few minutes and Y has a value of about a few seconds. In at least one embodiment, X has a value of about five minutes and Y has a value approximately equal to the firewall's 18 predefined timeout value. For a device controller 20 to keep a client device 12 validated, it may be configured to send keep-alive packets to the client device 12 with a frequency sufficient to meet the validation requirements.

The firewall 18 may be configured to ignore certain types of communications in assessing whether or not a client device 12 is validated. For example, a simple "ping" or Internet Control Message Protocol (ICMP) message may be deemed insufficient to count as communication from the device controller 20 to the client device 12. Otherwise, a malicious client device 12 could become validated by "pinging" the device controller 20 on a continuous basis.

Provided that the binding between the client device 12 and the device controller 20 is maintained as validated, the firewall 18 considers the client device 12 to be an authorized source of packets and allows UDP packets having a source address corresponding to the address of the client device 12 to traverse the firewall 18. Accordingly, any data packets for a media session with a destination elsewhere in the communication network 10 will be allowed to traverse the firewall 18 provided they originate from the address associated with the validated binding. It will be appreciated that such an embodiment relies upon a condition that the UDP data over the media paths and the signaling communications with the device controller 20 use the same address at the client device 12. If the media packets from the client device 12 originated at a different address than the address used for communications with the device controller 20, the firewall 18 would be unable to associate the media packets with the validated client device 12 and would not let them through. In other embodiments, the firewall 18 may extend the "validated" status to a range or subnet of source addresses or to a list of addresses so as to permit UDP data from a different address that the address of from which the signaling communications came. Such an embodiment may be particularly relevant in the context of IPv6 wherein IP addresses may have variable lengths.

In some embodiments, the firewall 18 may place restrictions upon the destination associated with any data packet from the client device 12. For example, the destination may be restricted to allowed configured gateway IP addresses/ports and any IP phone ports.

Figure 2:
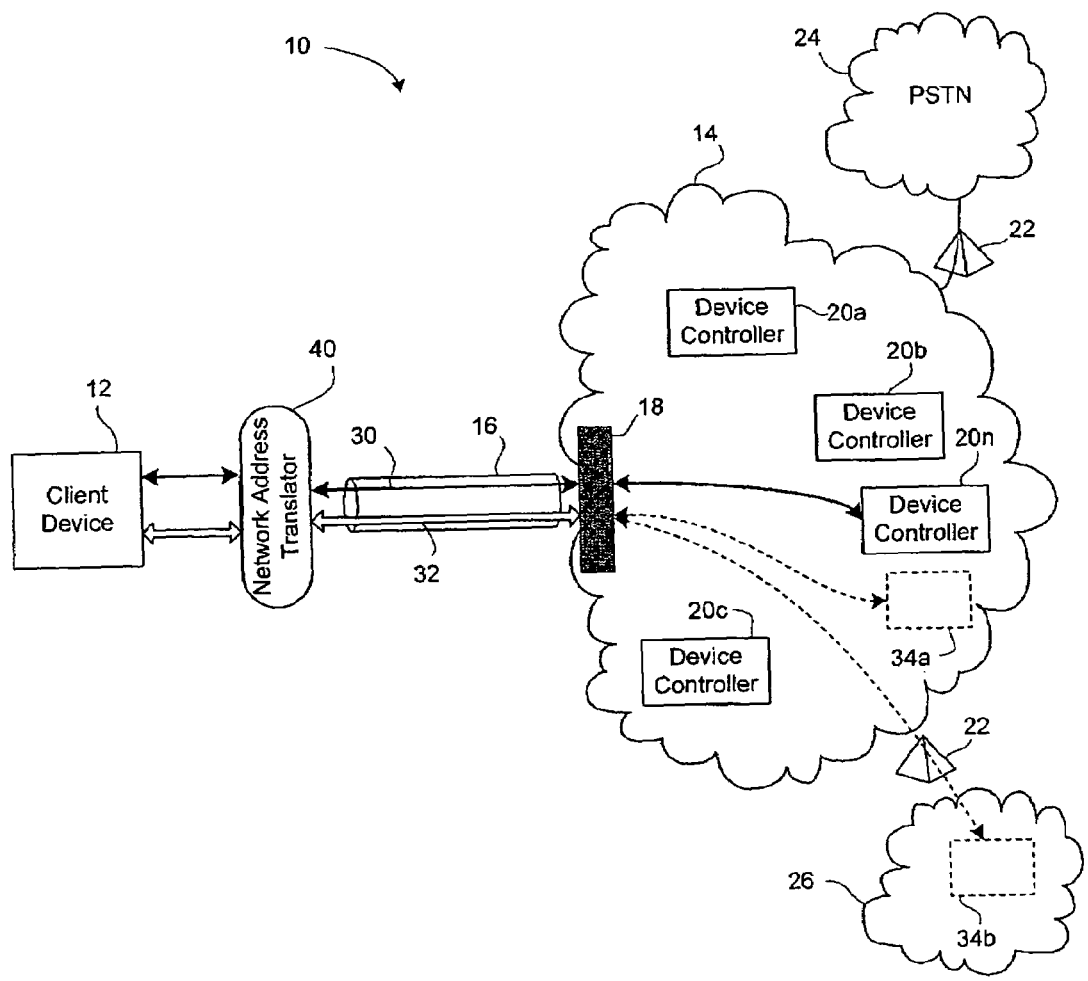
FIG. 2 shows the communication network of FIG. 1 including a network address translator (NAT)

The potential for abuse may also be constrained by limiting the number of media sessions the client device 12 establishes simultaneously. For example, the firewall 18 may limit the client device 12 to one RTP (real-time transport protocol) and RTCP (real-time transport control protocol) flow simultaneously per signaling link. In the case of multimedia client devices 12, the maximum number may be increased to allow for video channels, data channels, etc. Reference is made to FIG. 2, which shows the communication network 10 of FIG. 1 with a network address translator (NAT) 40.

If a device controller 20 ceases to communicate with a client device 12 with a sufficient frequency, then the firewall 18 will consider the client device 12 to have lost its authorized status and will begin blocking UDP packets from the client device 12.

It will be appreciated that the firewall 18 need not understand the protocol used by the client device 12 and the device controller 20. Accordingly, the communications between the client device 12 and the device controller 20 may be based upon proprietary protocols, of which the firewall 18 is completely unaware. It will also be understood that the communications between the client device 12 and the device controller 20 may be encrypted without impacting the ability of the firewall 18 to "validate" a client device 12.

Figure 3:
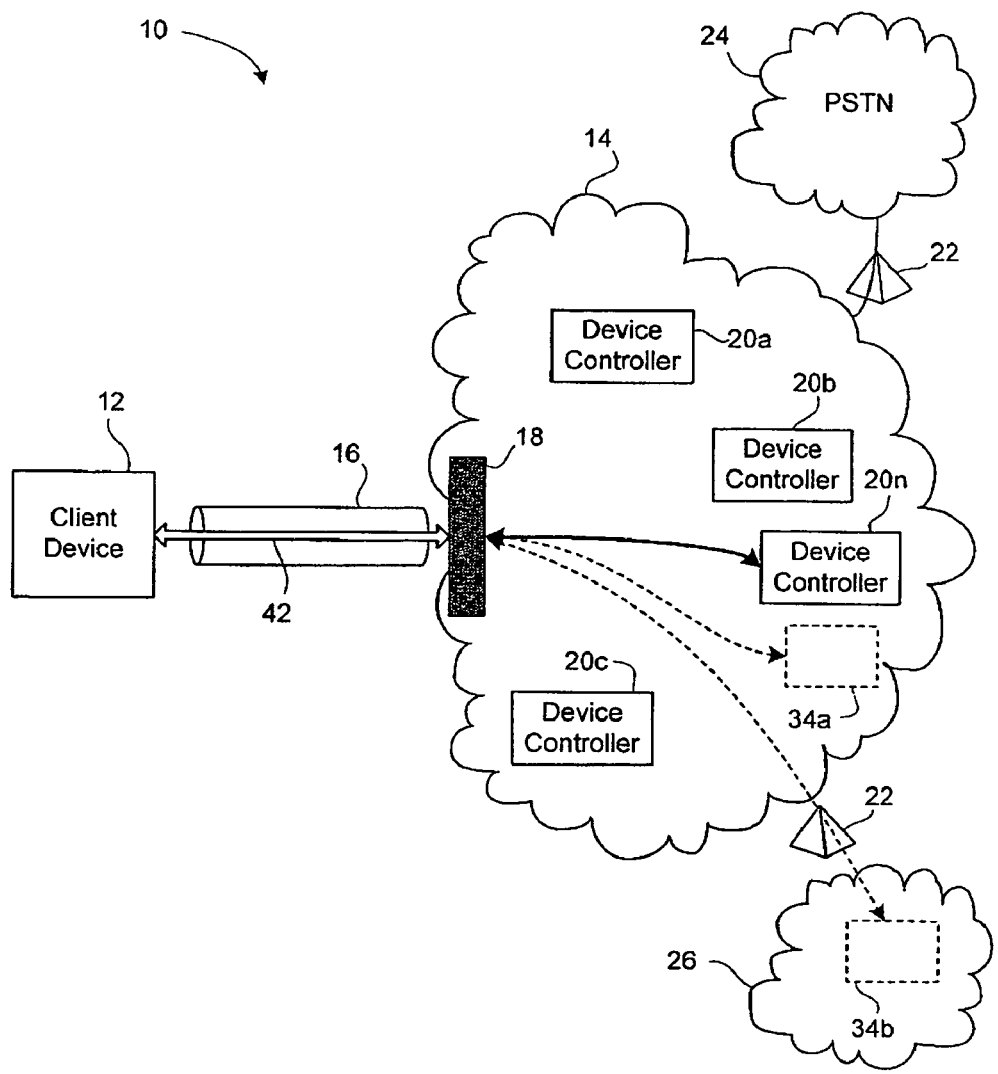
FIG. 3, diagrammatically shows another embodiment of the communication network.

Reference is now made to FIG. 3, which shows the communications network 10 according to another embodiment. The device controller 20 shown in FIG. 3 comprises a port discovery server. The port discovery server is an echo server for receiving binding inquiry messages over UDP from the client device 12 and responding with IP address information. The port discovery server may, for example, comprise a STUN server as described by IETF RFC 3489. Other port discovery servers conforming to other standard or proprietary protocols may also be used.

The port discovery server differs from, for example, a media gateway controller, in that it receives and sends port discovery messages with the client device 12 using a media path 42 instead of separate signaling or control paths. Accordingly, in such an embodiment there is no restriction that the client device 12 have the same address for its media and signaling.

In the embodiment shown in FIG. 3, the firewall 18 monitors packets from the port discovery server to the client device 12 and creates a binding based upon the source and destination addresses. It then applies any frequency, type, and/or duration conditions upon the communication between the client device 12 and the port discovery server to assess whether the client device 12 is authorized. Once authorized, the client device 12 is permitted to transmit UDP packets to other destinations from its IP address.

Figure 4:
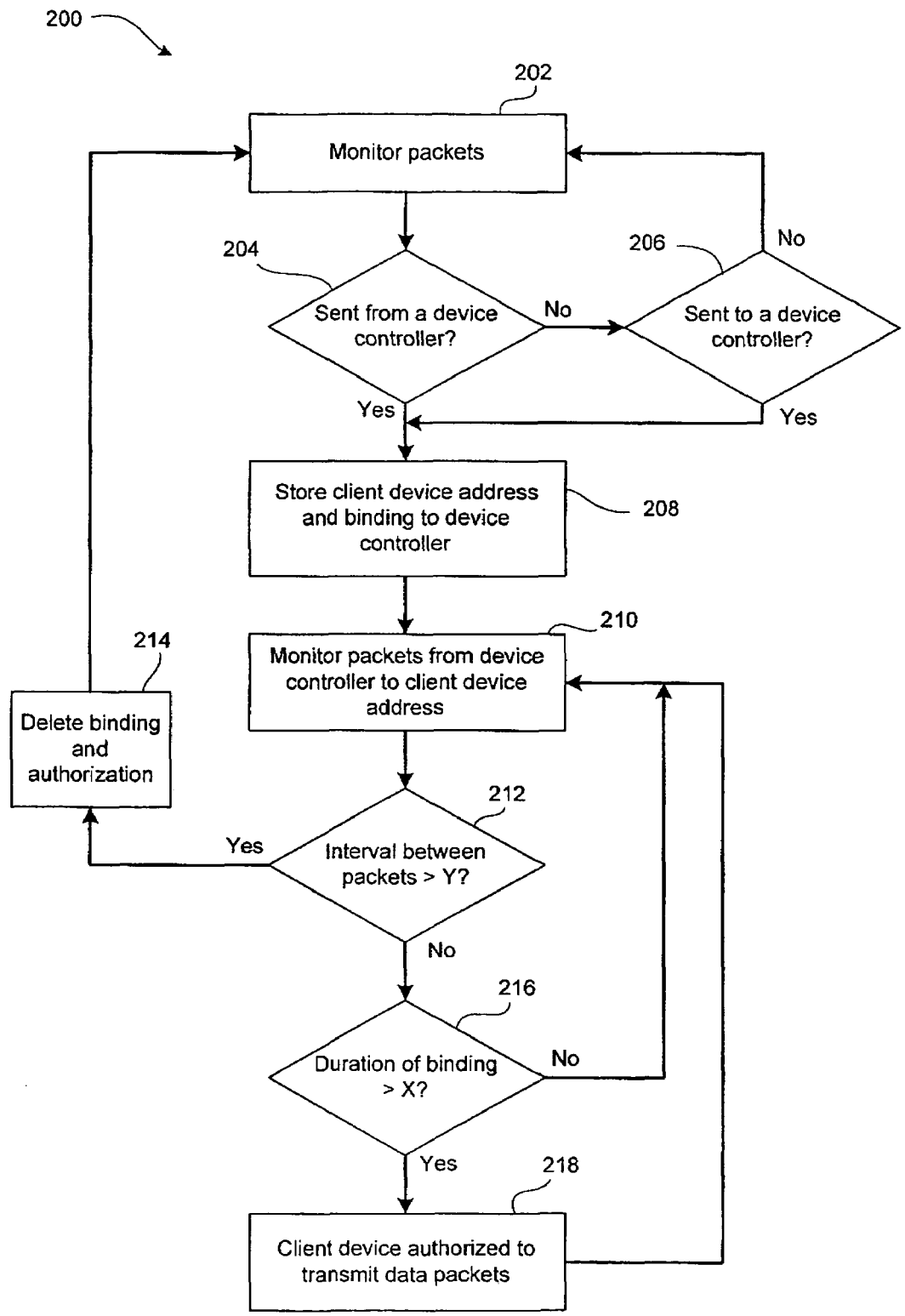
FIG. 4 shows, in flowchart form, a method of enabling firewall traversal for UDP packets from a client device.

Reference is now made to FIG. 4, which shows, in flowchart form, a method 200 of enabling firewall traversal for UDP packets from a client device.

The method 200 begins in step 202, wherein the firewall monitors packets. In particular, in step 204, the firewall assesses whether it has received any packets that are directed to the known device controller address. The firewall maintains a list or other data structure containing known device controller addresses. It may compare the destination addresses of any incoming packets with the addresses in its list to determine if any packets are directed to a known device controller.

Additionally or alternatively, in step 206, the firewall may monitor whether any outgoing packets are from destination addresses in the list of known device controller addresses. In other words, in step 206 the firewall assesses whether the device controller is sending a packet to a client device.

If a packet is either directed to a device controller or originating from a device controller, then in step 208 the firewall stores an association (binding) between the device controller address and the address from which the packet came or to which it is directed. If it is an outgoing packet from the device controller, then the firewall stores the destination address for the packet. If it is an incoming packet to the device controller, then the firewall stores the source address for the packet. If the association or binding between the two addresses is already known to the firewall—i.e. already contained in its data structure of bindings—then it need not store it again.

Having identified a potential relationship between the device controller and the address with which it is communicating, the firewall then monitors packets between the two addresses in step 210. In particular, the firewall monitors outgoing packets from the device controller address to the client device address. In step 212, the firewall assesses whether or not the interval between outgoing packets to the client device exceeds a threshold value Y. This may be implemented as a timeout counter for triggering a timeout if a period of time Y passes without the firewall receiving an outgoing packet from the device controller directed to the client device address.

If the interval between packets exceeds the threshold value Y, then in step 214 the firewall removes the association or binding and cancels any firewall rules that may have been established in step 218, described below.

If the interval between packets does not exceed the maximum threshold value Y, then in step 216 the firewall determines whether the device controller has been communicating with the client device address for more than a minimum period of time X. If not, then it continues at step 210 to monitor outgoing packets. If the minimum period of time X has been met with "continuous" communication from the device controller to the client device address, then the firewall may deem the client device to be "validated" or "authorized" in step 218. In step 218, based upon the validation of the client device, the firewall dynamically establishes a firewall rule permitting the traversal of UDP packets from the client device address that was stored in step 208. The firewall rule may incorporate certain restrictions, such as restrictions on permitted destination addresses. Other restrictions may also be incorporated, such as restrictions upon the number of concurrent media session per link.

Once the firewall rule is established in step 218, then the firewall continues to monitor outgoing packets from the device controller to ensure that it continues to communicate with the client device with sufficient frequency.

It will be appreciated that the present method and system for enabling firewall traversal bases the firewall decision upon the apparent trust between a device controller and a client device. In one embodiment, this trust is inferred from the fact that the device controller is communicating with the client device on a sufficiently frequent basis. It will be understood that to be effective this communication by the device controller must be voluntary and cannot simply constitute acknowledgement of requests. Otherwise illegitimate devices could send periodic requests or "ping" messages to a device controller so as to trigger near-continuous acknowledgement responses and thereby trick the firewall into deeming the device to be authorized. It will be appreciated that many existing device controllers having a minimal degree of sophistication will already be designed to ignore these types of tactics so as to avoid denial-of-service attacks.

In another embodiment, the firewall 18 bases its "authorization" of the client device 12 on the nature or type of communication established between the device controller 20 and the client device 12. Certain types of communication will imply a certain level of trust between the device controller 20 and the client device 12. Accordingly, if the firewall 18 recognizes this type of communication, then it may rely upon that implicit trust to permit the client device 12 to send data packets to other destinations.

In one embodiment, the client device 12 and the device controller 20 establish secure communications with each other. For example, they may use IPSec (Secure Internet Protocol), SSL (secure sockets layer), or TLS (Transport Layer Security). IPSec is a protocol that implies a security association. SSL and TLS are session-based protocols that run over TCP (transport control protocol). Accordingly, the firewall 18 may rely upon the fact that the device controller 20 has entered into a security association or a secure session with the client device 12 in choosing to "authorize" the client device.

In another embodiment, the client device 12 and the device controller 20 establish a session, whether secure or unsecured. For example, the device controller 20 and the client device 12 may establish a session using TCP signaling. The establishment of a session implies a certain level of trust or acknowledgement that the firewall 18 may be configured to rely upon in deeming the client device 12 to be "authorized".

The present application may be embodied in other specific forms without departing from the spirit or essential characteristics thereof. Certain adaptations and modifications of the above described embodiments will be obvious to those skilled in the art. Therefore, the above discussed embodiments are considered to be illustrative and not restrictive, the scope of the application being indicated by the appended claims rather than the foregoing description, and all changes which come within the meaning and range of equivalency of the claims are therefore intended to be embraced therein.

What is claimed is:

1. A method for establishing a trust relationship with a client device so as to enable future packet communications from the client device to a remote location through a firewall, the firewall being located between the client device and a device controller, the method comprising the steps of:
    associating the client device with the device controller based upon a packet exchanged between the client device and the device controller;
    monitoring communications from the device controller to the client device to determine whether the client device is authorized; and
    creating a firewall rule allowing the transmission of data packets from the client device to the remote location if the client device is authorized, wherein the firewall rule permits the transmission of data packets based on the fact they are sent from the client device address, and wherein the data packets are addressed to the remote location and not the device controller.

2. The method claimed in claim 1, wherein said step of associating includes storing the client device address in association with a device controller address based upon said packet.

3. The method claimed in claim 2, wherein said device controller address includes IP address information corresponding to a signalling port for the known device controller.

4. The method claimed in claim 1, wherein said step of monitoring includes determining whether a time interval between packets sent from the device controller to the client device exceeds a predetermined maximum and, if so, deeming the client device to be unauthorized.

5. The method claimed in claim 4, wherein said step of monitoring further includes determining whether a duration of association between the client device and the device controller exceeds a predetermined minimum and, if so, holding the client device to be authorized.

6. The method claimed in claim 1, wherein said step of monitoring includes identifying a session established between the client device and the device controller, and authorizing the client device based upon said session.

7. The method claimed in claim 1, wherein said step of monitoring includes identifying a security relationship between the client device and the device controller, and authorizing the client device based upon said security relationship.

8. The method claimed in claim 1, wherein said firewall rule includes a restriction on permissible destination IP address and/or port.

9. The method claimed in claim 1, further including a step, following said step of allowing, of observing communications from the device controller to the client device to determine whether the client device remains authorized.

10. The method claimed in claim 9, further including a step of disallowing the transmission of data packets from the client device to the remote location if said step of observing determines that the client device ceases to remain authorized.

11. The method claimed in claim 1, wherein said communications from the device controller to the client device comprise control and/or signalling packets.

12. A system for establishing a trust relationship with a client device so as to enable future packet communications from the client device to a remote location through a firewall, the firewall being located between a client device and a device controller, the system comprising:
    memory storing an association between the client device and the device controller;
    a processor;
    a detection component for detecting a packet exchange between the client device and the device controller and, based upon said detection, storing said association in said memory, and wherein said association includes a client device address and a device controller address;
    a monitoring component for monitoring packets received from the device controller and addressed to the client device and for determining if the client device is authorized based upon said received packets; and
    a firewall update component responsive to said monitoring component for setting a firewall rule, said firewall rule permitting passage of data packets from said client device to the remote location, wherein the firewall rule permits the transmission of data packets based on the fact they are sent from the client device address, and wherein the data packets are addressed to the remote location and not the device controller.

13. The system claimed in claim 12, wherein said monitoring component includes a component for determining whether an interval between said packets received from the device controller exceeds a predetermined maximum and, if so, determining that the client device is unauthorized.

14. The system claimed in claim 13, wherein said monitoring component further includes a component for determining whether said packets have been received over a period of time exceeding a predetermined minimum and, if so, determining that the client device is authorized.

15. The system claimed in claim 12, wherein said monitoring component includes a component for identifying a session established between the client device and the device controller based upon said packets, and authorizing the client device based upon said session.

16. The system claimed in claim 12, wherein said monitoring component includes a component for identifying a security relationship between the client device and the device controller based upon said packets, and authorizing the client device based upon said security relationship.

17. The system claimed in claim 12, wherein said monitoring component continues monitoring said packets for determining whether the client device remains authorized following said setting of said firewall rule.

18. The system claimed in claim 17, wherein said firewall update component cancels said firewall rule in response to a determination by said monitoring component that the client device ceases to be authorized.

19. The system claimed in claim 12, wherein the device controller comprises a media gateway controller and the client device comprises a media gateway.

20. The system claimed in claim 12, wherein the device controller comprises a port discovery server.

* * * * *

UNITED STATES PATENT AND TRADEMARK OFFICE
CERTIFICATE OF CORRECTION

PATENT NO.        : 7,594,259 B1                                    Page 1 of 1
APPLICATION NO.   : 10/941719
DATED             : September 22, 2009
INVENTOR(S)       : Audet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Twenty-eighth Day of September, 2010

David J. Kappos
*Director of the United States Patent and Trademark Office*